Figure 1:
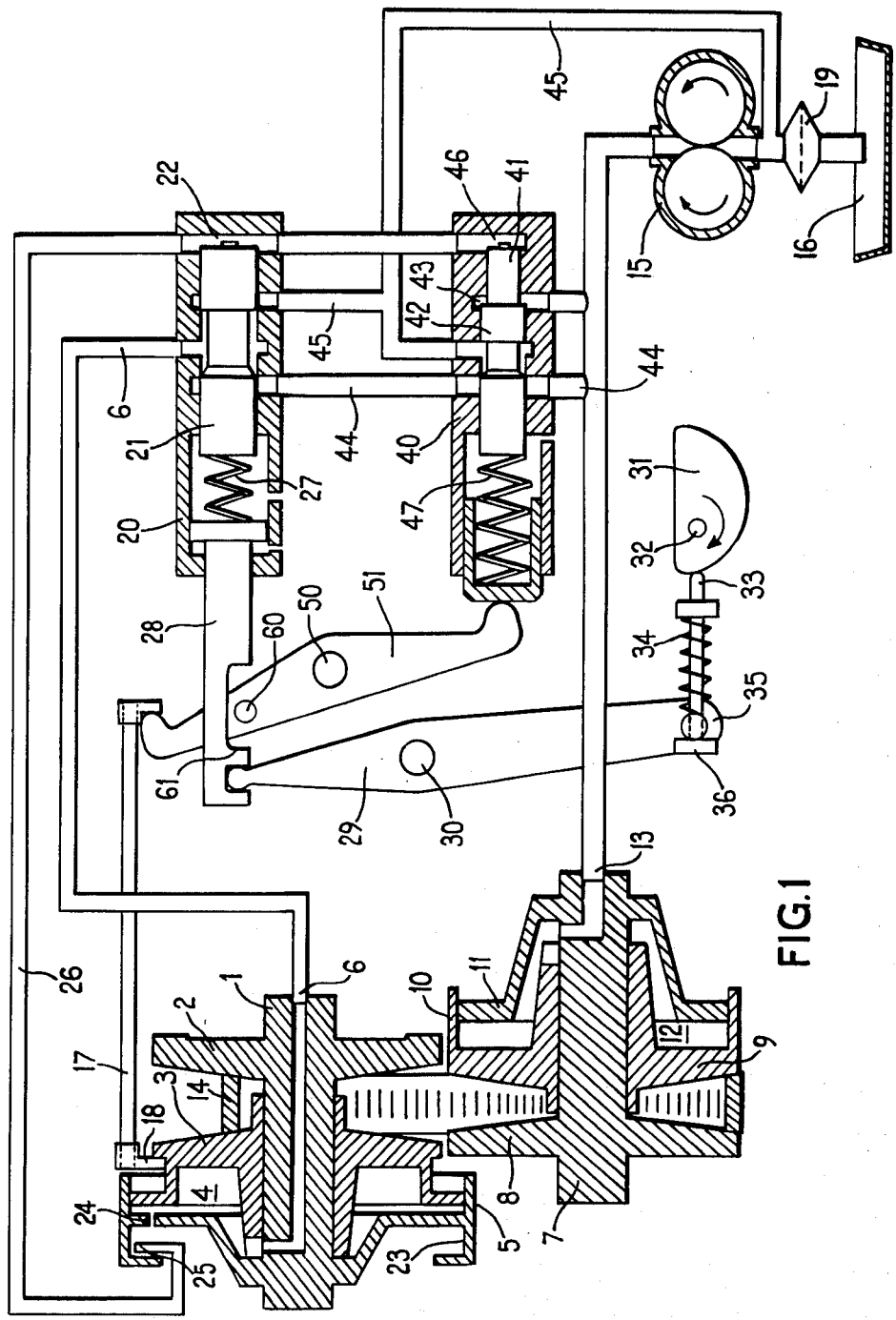

United States Patent [19]

van Deursen et al.

[11] Patent Number: 4,467,674
[45] Date of Patent: Aug. 28, 1984

[54] CONTROL OF AN INFINITELY VARIABLE TRANSMISSION OF A MOTOR VEHICLE

[75] Inventors: Petrus H. van Deursen, Deurne; Frederik E. C. van der Hardt Aberson, Nuenen, both of Netherlands

[73] Assignee: Van Doorne's Transmissie B.V., Tilburg, Netherlands

[21] Appl. No.: 252,195

[22] Filed: Apr. 8, 1981

Related U.S. Application Data

[63] Continuation of Ser. No. 28,853, Apr. 10, 1979, abandoned.

[30] Foreign Application Priority Data

May 3, 1978 [NL]  Netherlands ......................... 7804737

[51] Int. Cl.[3] ........................ B60K 41/12; B60K 41/16
[52] U.S. Cl. ......................................... 74/867; 74/859; 74/860; 74/872
[58] Field of Search .................. 74/857, 859, 860, 858, 74/867, 872, 873; 474/11, 12, 18, 28, 29

[56] References Cited

U.S. PATENT DOCUMENTS

| | | |
|---|---|---|
| 3,043,152 | 7/1962 | Karig et al. |
| 3,052,132 | 9/1962 | Dittrich et al. |
| 3,200,666 | 8/1965 | Schrodt et al. ........................ 74/857 |
| 3,256,747 | 6/1966 | Kempson ................................ 74/857 |
| 3,360,069 | 12/1967 | Chana et al. ........................... 74/859 |
| 3,395,586 | 8/1968 | Kirchner ................................ 474/11 |
| 3,600,961 | 8/1971 | Rattunde ............................... 474/28 |
| 3,893,344 | 7/1975 | Dantlgraber .......................... 74/867 |
| 3,941,016 | 3/1976 | Will ....................................... 74/867 |
| 3,943,715 | 3/1976 | Miyao .................................... 74/857 |
| 4,094,203 | 6/1978 | van Deursen ......................... 474/28 |
| 4,152,947 | 5/1979 | van Deursen |
| 4,161,894 | 7/1979 | Giacosa ................................. 74/863 |
| 4,229,988 | 10/1980 | Rattunde ............................... 474/28 |

FOREIGN PATENT DOCUMENTS

| | | |
|---|---|---|
| 1162207 | 1/1964 | Fed. Rep. of Germany ........ 474/12 |
| 1256023 | 12/1967 | Fed. Rep. of Germany ........ 474/28 |
| 1200668 | 7/1970 | United Kingdom . |
| 1525674 | 9/1978 | United Kingdom . |

*Primary Examiner*—Allan D. Herrmann
*Assistant Examiner*—D. Wright
*Attorney, Agent, or Firm*—Cushman, Darby & Cushman

[57] ABSTRACT

Apparatus for controlling the transmission ratio of an infinitely variable motor vehicle transmission of the type including a belt and two pulleys each having conical discs which are hydraulically movable toward and away from each other, the apparatus including a hydraulic valve having an axially movable internal pilot slide for supplying and exhausting hydraulic fluid to the movable pulley discs to effect movement thereof, a first device responsive to actual engine speed for urging the slide in a first direction, a second device responsive to desired engine speed for applying an urging force on the slide in a second, opposite direction, and a third device for limiting the resulting urging force on the slide in the second direction, the third means being responsive to the transmission ratio.

4 Claims, 2 Drawing Figures

CONTROL OF AN INFINITELY VARIABLE TRANSMISSION OF A MOTOR VEHICLE

This is a continuation of application Ser. No. 28,853 filed Apr. 10, 1979 now abandoned.

The invention relates to an apparatus for controlling the transmission ratio of an infinitely variable transmission of a motor vehicle, the transmission ratio being adjustable depending on the position of a hydraulic control valve which is movable under influenece of the difference between a required and an actual engine speed.

Such an apparatus is disclosed in Dutch patent application 76.01286, (U.K. Pat. No. 1,525,674 and U.S. Pat. No. 4,152,947) according to which the hydraulic control valve on the one end is loaded by a fluid pressure which is built up by means of a Pitot tube, depending on the engine speed (i.e. speed of the primary shaft). On the other end the control valve is loaded by a spring which is biased in dependence on the inlet manifold pressure of the engine or the position of the throttle pedal. It is also possible to bias said spring on the basis of other signals, e.g. electronically processed, or to operate the control valve differently, depending on the difference between required and actual speed.

In such an apparatus the transmission ratio of the transmission is always set and adjusted in such a way that the engine speed is higher when more motor power is provided and lower when less motor power is provided.

This regulation of the engine speed takes place between two limits, viz. between a minimum and a maximum engine speed (the maximum engine speed may also be indicated as full throttle or kick down engine speed). Below the minimum engine speed the transmission is always in the lowest gear (=highest transmission ratio) and above the maximum control speed the transmission is always in the highest gear (=lowest transmission ratio). These two engine speeds are primarily chosen on account of the desired performance. For high performances (acceleration times and the like) high engine speeds are required and in connection with the comfort (sound level and the like) and fuel saving low engine speeds are desirable: The chosen value in particular for the maximum engine speed (full throttle or kick down speed) however always remains a compromise, with naturally as drawback that certain wishes are ignored.

It is the object of the invention to provide an apparatus for controlling the transmission ratio of an infinitely variable transmission of a motor vehicle, while eliminating the above drawback.

To this effect according to the invention means are provided for limiting the maximum engine speed depending on the transmission ratio in the sense that at a lower ratio (i.e. a higher gear) a higher engine speed is possible. Since for each transmission ratio there exists a direct proportional relation between engine speed and vehicle speed, the result is that the maximum engine speed (full throttle or kick down speed) increases at a higher vehicle speed.

In this manner, on the one hand it is possible to meet the comfort requirements, which especially at lower vehicle speed necessitate a limitation of the maximum engine speed, while on the other hand, at higher vehicle speeds, the performance can be improved, hich is inter alia of importance for an overtaking operation, in which a rapid acceleration is required. In the apparatus according to the invention it is even possible to effect at very high vehicle speed a kick down effect, i.e. a shift down, which is highly advantageous for a sporting driving behaviour.

An other advantage of the apparatus according to the invention is its applicability as automatic overdrive arrangement. If the drive line of a vehicle is laid out such that under normal conditions the maximal speed of the vehicle is attained at a higher transmission ratio of the transmission than the minimum one (i.e. at a lower gear than the highest gear), the lowest transmission ratio (the highest gear) or range of ratios (with infinitely variable transmissions) can be mentioned as overdrive. If an overdrive or overdrive effect is present, and the transmission, consequently at high vehicle speeds need not always be in the highest gear, the apparatus according to the invention will enable an automatic shift down at high vehicle speeds. For this it is necessary that a maximum vehicle speed a transmission ratio can be adjust in which the engine speed is so as to achieve maximum engine power. With the conventional arrangement it is only possible to have maximum vehicle speed at the minimum transmission ratio (highest gear).

According to an other feature of the invention the maximum engine speed is substantially inversely proportional to the transmission ratio. This results in a continuous increase of the engine speed during the acceleration with full throttle or kick down, thus enhancing the comfort.

The invention more in particular relates to an apparatus for controlling an infinitely variable transmission, wherein the hydraulic control valve on the one end can be loaded by a fluid pressure depending on the engine speed and on the other end loaded by a spring which, depending on the required speed, can be biased, which apparatus according to the invention is characterized in that the biasing possibility is limited in dependence on the transmission ratio.

Furthermore, according to the invention, in an apparatus wherein the spring can be biased through an axially movable operating member, the maximal movement of the operating member can be limited by a stop movable in dependence on the transmission ratio.

When the infinitely variable transmission comprises a V-belt transmission having at least one pulley a conical disk of which is axially movable in order to adjust the transmission ratio, and the apparatus is provided with a sensor member for sensing the position of the axially movable disk, said sensor member according to the invention can displace the stop.

Two embodiments according to the invention will now be explained, by way of example, with reference to the accompanying drawings.

Figure 2:
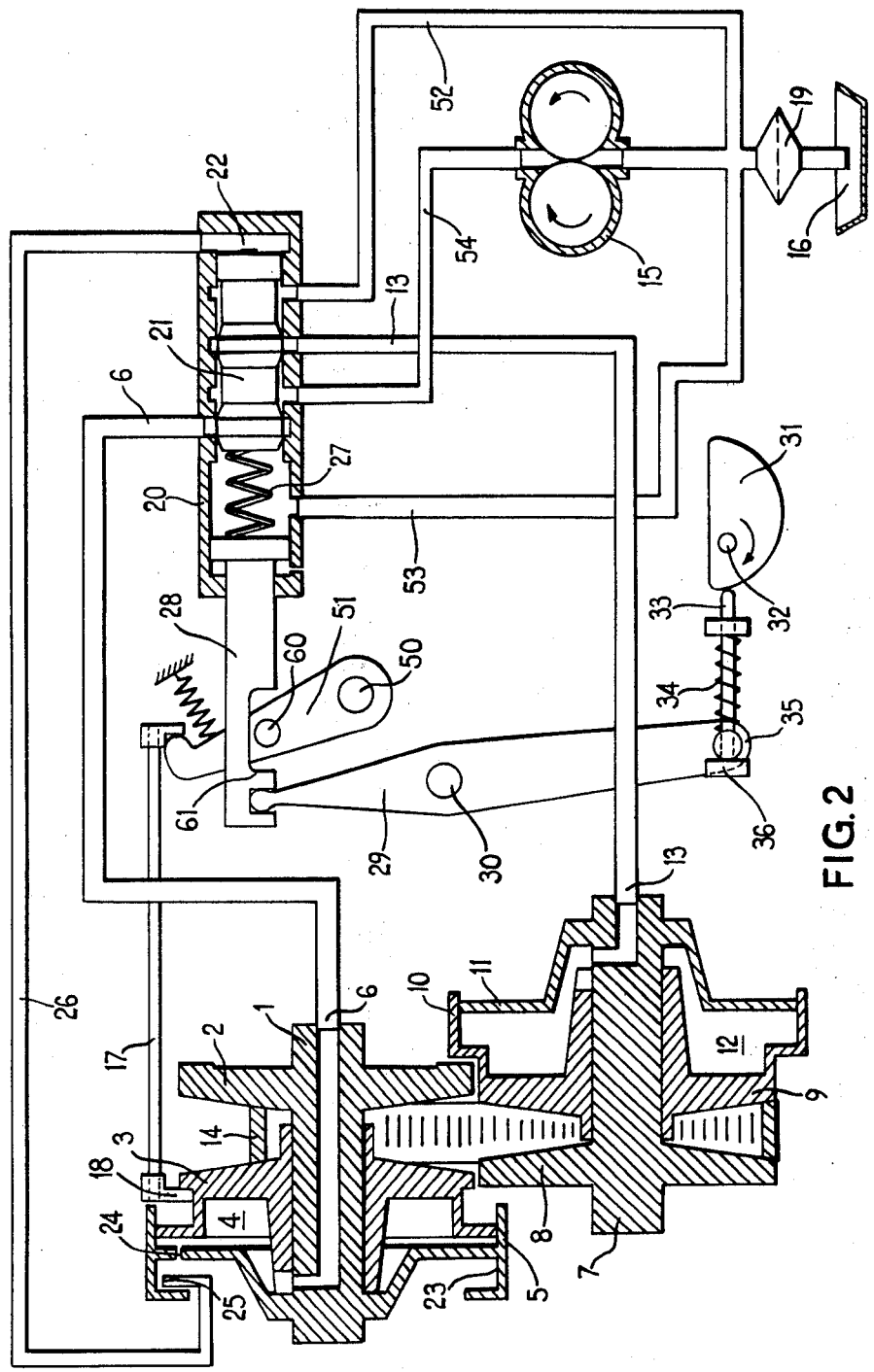

FIG. 1 diagrammatically shows the apparatus for controlling the transmission ratio of an infinitely variable V-belt transmission, wherein are present two valves, which control respectively the belt tension and the transmission ratio and FIG. 2 shows a similar apparatus provided with only one valve.

The two figures show corresponding parts with identical reference numerals.

The diagrammatically shown embodiments comprises a primary or input shaft 1 provided with an axially stationary conical disk 2 and an axially movable conical disk 3, which jointly form the primary pulley. Disk 3 forms the piston of the cylinder 5 comprising cylinder space 4 and is adapted for axial movement by fluid supply and discharge via conduit 6. Furthermore there is disposed a secondary or output shaft 7, likewise provided with an axially stationary conical disk 8 and an axially movable conical disk 9, which together constitute the secondary pulley. Disk 9 is integrally connected to cylinder 10 wherein is accommodated the piston 11 affixed to the secondary shaft 7, so that cylinder space 12 is enclosed. Fluid pressure to cylinder space 12 is supplied via conduit 13.

About the primary and secondary pulley there is mounted a V-shaped driving belt 14, which may be a rubber driving belt, but preferably it is a metal driving belt for example as described in U.S. Pat. No. 4,080,841. By axial movement of the conical disks 3 and 9, the running radii of the driving belt on the two pulleys may be so varied that the difference in rotation speed of shafts 1 and 7 can be infinitely regulated. The fluid pressures in cylinder spaces 4 and 12 moreover result in the presence of the required tensioning of the driving belt 14.

Furthermore both embodiments are provided with a fluid pump 15 for sucking in and pressurizing fluid from a reservoir 16 via filter 19. For detecting the existing transmission ratio there is disposed a rod 17, which rests against the axially movable disk 3 through sensor shoe 18. Rod 17 moves in axial direction in dependence on the transmission ratio.

The transmission ratio of the infinitely variable transmission (shafts, pulleys and driving belt) is regulated by means of valve 20, provided with an axially movable pilot slide 21. Slide 21 is loaded on the one end by the fluid pressure in space 22, which fluid pressure depends on the primary or input speed. For taking up this speed signal there is mounted on cylinder 5 a radially outwardly closed annular gutter 23, which is filled with fluid from cylinder space 4 via passage 24. By means of Pitot tube 25, in gutter 23, fluid rotating with primary shaft 1 is converted inot a pressure which, via conduit 26, is passed on to space 22.

On the other end pilot slide 21 is loaded by the tension of spring 27, which is tensioned through operating member 28. To this effect operating member 28 is axially displaced by lever 29 pivotting upon fixed axis 30. This movement takes place in that cam 31 is rotated about axis 32, thus displacing axially cam follower 33. Cam follower 33 is fitted with a spring 34 which presses the end 35 of lever 29 against stop 36 of cam follower 33.

The rotation of cam 31 about axis 32 may take place in dependence on the position of the accelerator pedal of the vehicle or for instance the position of the throttle valve of the engine. To this effect said cam may be mechanically connected to e.g. the throttle valve, whereby the shape of the cam defines the relation between the position of the throttle valve and the displacement of operating member 28.

In the embodiment shown in FIG. 1 there is disposed an overflow valve 40 for regulating the fluid pressure pressurized by pump 15, which pressure also prevails in cylinder space 12. Valve 40 is fitted with an axially movable slide 41. Since slide 41 is provided with an enlarged portion 42, being in contact with the fluid in space 43 supplied by the pump 15, the slide 42 will move to the left (in the figure) at increasing fluid pressure. Upon sufficient displacement of slide 41 the fluid in conduit 44 may flow back via conduit 45 to the low pressure side of pump 15.

Slide 41, which thus controls the pressure supplied by pump 15, is also influenced by the fluid pressure in space 46 depending on the input speed (engine speed) and by the tension of spring 47, which is tensioned via rod 17 and the lever 51 rotatable about axis 50, depending on the actual transmission ratio. It will be clear that in this manner the tension in the driving belt 14 is regulated through the fluid pressure in cylinder space 12, depending on input speed and transmission ratio. However, it is also possible to control this tension correspondingly on other parameters, e.g. the torque to be transmitted.

In the apparatus according to the embodiment depicted in FIG. 1, the transmission ratio is adjusted in that pilot slide 21, connects either conduit 44 to conduit 6 (displacement of pilot slide 21 to the left) so that the fluid supplied by pump 15 can flow conduits 44 and 6 to primary cylinder space 4, or connects conduit 6 to conduit 45 (displacement of pilot slide 21 to the right), so that fluid can flow away from cylinder space 4 via conduits 6 and 45 to the low pressure side of pump 15.

For displacement of conical disk 3 of the primary pulley it is naturally necessary that the effective surface of cylinder-piston unit 3,5 is larger than that of cylinder-piston unit 10,11 so that at equal fluid pressure in both cylinder spaces 4 and 12, the force on conical disk 3 is larger than that on conical disk 9. In a stationary condition (non-varying transmission ratio) pilot slide 21 will be in an equilibrium condition, whereby the fluid pressure in line 6 is lower than that in line 44.

As in the apparatus shown in FIG. 1, in the embodiment shown in FIG. 2 a displacement of pilot slide 21 to the left results in that fluid flows to cylinder space 4, so that the transmission shifts up to a higher gear, (i.e. to a lower transmission ratio), i.e. the running radius on the primary pulley increases and that on the secondary pulley decreases accordingly. A displacement of pilot slide 21 to the right results accordingly in a shift down to a lower gear. The embodiment shown in FIG. 2 will be explained in the following.

As shown in FIG. 2 the fluid supplied by pump 15 via conduit 54 is conducted to valve 20. Depending on the position of pilot slide 21, subsequently the fluid pressure in conduit 54, is conducted either via conduit 6 to cylinder space 4, or via conduit 13 to cylinder space 12. In the former case the fluid will flow away form cylinder space 12 via conduit 13 to conduit 52, and in the latter case valve 20 connects conduit 6 to conduit 53, so that the fluid from cylinder space 4 will flow away to the low pressure side of pump 15. In the stationary position pilot slide 21 will be in an equilibrium position, whereby the measured input speed (fluid pressure in space 22) corresponds with the required input speed (the tension of the spring 27 biased through rotation of cam 31.)

It will be evident that in the embodiment shown in FIG. 2 pump 15 can not be a pump with fixed fluid displacement. Since the invention is applicable to both embodiments similarly, the following explanation applies to the devices shown in both figures.

As already explained in the above, a change of the transmission ratio results in a displacement of rod 17. Rod 17 senses the position of axially movable disk 3 via sensor shoe 18. This displacement produces a displacement of stop 60 on lever 51 rotatable about axis 50. Stop 60 coacts with face 61 of operating member 28 in such a way that the displacement possibility of operating member 28 to the right is limited. When cam 31 has rotated so far that face 61 touches stop 60 a subsequent rotation of cam 31 will only result in that end 35 of lever 29 is released from stop 36 of cam follower 33, so that spring 34 is compressed. Operating member 28, however, is not displaced unless the stop 60 moves to the right as a result of a reduction of the transmission ratio (shifting into a higher gear of the transmission). Naturally, this dependence between the maximum engine speed to be regulated and the transmission ratio present can be realized also in many other manners than given in the example

We claim:

1. Apparatus for controlling the transmission ratio of a motor vehicle transmission of the infinitely variable ratio type including a belt and two pulleys, each pulley having conical discs which are hydraulically movable toward and away from each other, said apparatus comprising hydraulic valve means including an axially movable internal pilot slide for supplying and exhausting hydraulic fluid to the movable pulley discs to effect movement thereof, first means responsive to actual engine speed for urging said slide in one direction, second means responsive to desired engine speed for applying an urging force on said slide in an opposite direction, and third means for limiting the resulting urging force on said slide in said opposite direction, said third means being responsive to the transmission ratio.

2. Apparatus as in claim 1 wherein said first means includes means for loading said pilot slide with fluid pressure in response to actual engine speed, and wherein said second means includes a spring applying said urging force to the other end of said slide and means for biasing said spring in response to desired engine speed.

3. Apparatus as in claim 2 wherein said means for biasing said spring includes an axially displaceable operating member and wherein said third means includes a movable stop which limits the maximum axial displacement of said operating member, movement of said stop being responsive to the transmission ratio.

4. Apparatus as in claim 3 including a sensor for sensing the axial position of one of said conical discs, said sensor axially displacing said stop.

* * * * *